US007886080B2

(12) United States Patent
Sajassi et al.

(10) Patent No.: US 7,886,080 B2
(45) Date of Patent: Feb. 8, 2011

(54) MANAGEMENT OF TOPOLOGY CHANGES IN LAYER TWO NETWORKS

(75) Inventors: Ali Sajassi, San Ramon, CA (US); Samer M. Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 11/948,405

(22) Filed: Nov. 30, 2007

(65) Prior Publication Data

US 2009/0144403 A1    Jun. 4, 2009

(51) Int. Cl.
*G06F 15/16*     (2006.01)
*G06F 15/177*    (2006.01)

(52) U.S. Cl. .................. 709/242; 709/220; 709/221; 709/222; 370/254

(58) Field of Classification Search ......... 709/220–222, 709/242; 370/254
See application file for complete search history.

(56) References Cited

U.S. PATENT DOCUMENTS

| 2002/0046271 | A1* | 4/2002 | Huang .................. 709/223 |
| 2004/0047300 | A1  | 3/2004 | Enomoto et al. |
| 2005/0094575 | A1* | 5/2005 | Park .................... 370/254 |

FOREIGN PATENT DOCUMENTS

WO    WO-2009073454 A1    6/2009

OTHER PUBLICATIONS

"International Application Serial No. PCT/US2008/084592, International Search Report mailed Mar. 27, 2009", 5 pgs.
"International Application Serial No. PCT/US2008/084592, Written Opinion mailed Mar. 27, 2009", 12 pgs.
Bocci, B. M, et al., "VPLS Extensions for Provider Backbone Bridging", *IETF Standard-Working-Draft, Internet Engineering Task Force*, ch No, 1, [Online]. Retrieved from the Internet: <URL: http://tools.ietf.org/html/draft-balus-l2vpn-vpls-802.1ah-03>, (Jul. 8, 2007), 27 pgs.
Samer, A. S, et al., "Customer MAC Address Flushing Mechanisms for Provider Backbone Bridging over VPLS", [Online]. Retrieved from the Internet: <URL: http://tools.ietf.org/html/draft-sajassi-l2vpn-pbb-vpls-cmac-flush-00>, (Jul. 1, 2008), 23 pgs.
Samer, A. S, et al., "VPLS Interoperability with Provider Backbone Bridges", *IETF standard- working-0Draft, Internet Engineering Task Force*, Ch, No. 1, [Online]. Retrieved.from the Internet: <URL: http://tools.ietf.org/html/draft-sajassi-l2vpn-vpls-pbb-interop-01>, (Jul. 1, 2007), 28 pgs.

* cited by examiner

*Primary Examiner*—Philip J Chea
(74) *Attorney, Agent, or Firm*—Schwegman, Lundberg & Woessner, P.A.

(57) ABSTRACT

In one embodiment, a method for managing topology changes in a Layer 2 network is provided. The method may comprise receiving a change notification at a provider edge bridging device and associating the change notification with a customer service. The method may further comprise identifying at least one destination provider edge bridging device associated with the customer service, encapsulating the change notification in a data frame and tunnelling the data frame over a tunnel comprising at least one core device to the at least one destination provider edge bridging device associated with the customer service, the at least one core bridging device tunnelling the data frame based on information relating to the destination provider edge bridging device.

22 Claims, 8 Drawing Sheets

MANAGEMENT OF TOPOLOGY CHANGES IN LAYER TWO NETWORKS

FIELD

The present disclosure relates generally to data communication in a Layer 2 or Data Link Layer network where dual-homing is employed.

BACKGROUND

A Layer 2 customer network with its own physical connectivity can be connected to a provider backbone network at more than one point of attachment. This type of topology is called dual-homing and is used to increase the reliability of a data transport connection for a customer network. For example, such network topologies are designed to protect a customer network against the failure or removal of particular network components by providing redundant network paths.

The customer networks may use their own instances of spanning tree protocol (STP) to configure and partition their network's active topology so that the provider backbone connectivity does not result in a data loop. However, reconfiguration of a customer's active topology can result in the apparent movement of customer end devices from the point of view of provider backbone edge bridges. For example, in instances where a particular provider edge bridge fails, a dual-homed customer end device may send frames over the alternative redundant network path. The other provider edge bridges may however have address tables, e.g., bridging tables containing MAC (Media Access Control) addresses, which still refer to the previous active data path. Any bridged traffic destined from a remote customer end device to the dual-homed customer device may accordingly be wrongfully encapsulated with data in the address tables and sent over a MAC tunnel to the failed provider edge bridge, resulting in the data not being received by the destination customer end device and the data therefore being black-holed.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth to provide a thorough understanding of an embodiment of the present disclosure. It will be evident, however, to one skilled in the art that the present disclosure may be practiced without these specific details.

Overview

An apparatus and method for managing topology changes in a Layer 2 network is provided. The method may comprise receiving a change notification at a provider edge bridging device and associating the change notification with a customer service. The method may further comprise identifying the set of provider edge bridging devices associated with the customer service, encapsulating the change notification in a data frame and tunnelling the data frame over the service tunnel to the destination provider edge bridging device(s) associated with the customer service. The service tunnel comprises of zero or more core bridging device(s) that forward the data frame based on information relating to the destination provider edge bridging device. In an example embodiment, a provider network may rely on a tunnelling mechanism which allows provider core equipment to forward Layer 2 customer frames between provider edge devices without knowledge of customer MAC addresses.

Example Embodiments

Figure 1:
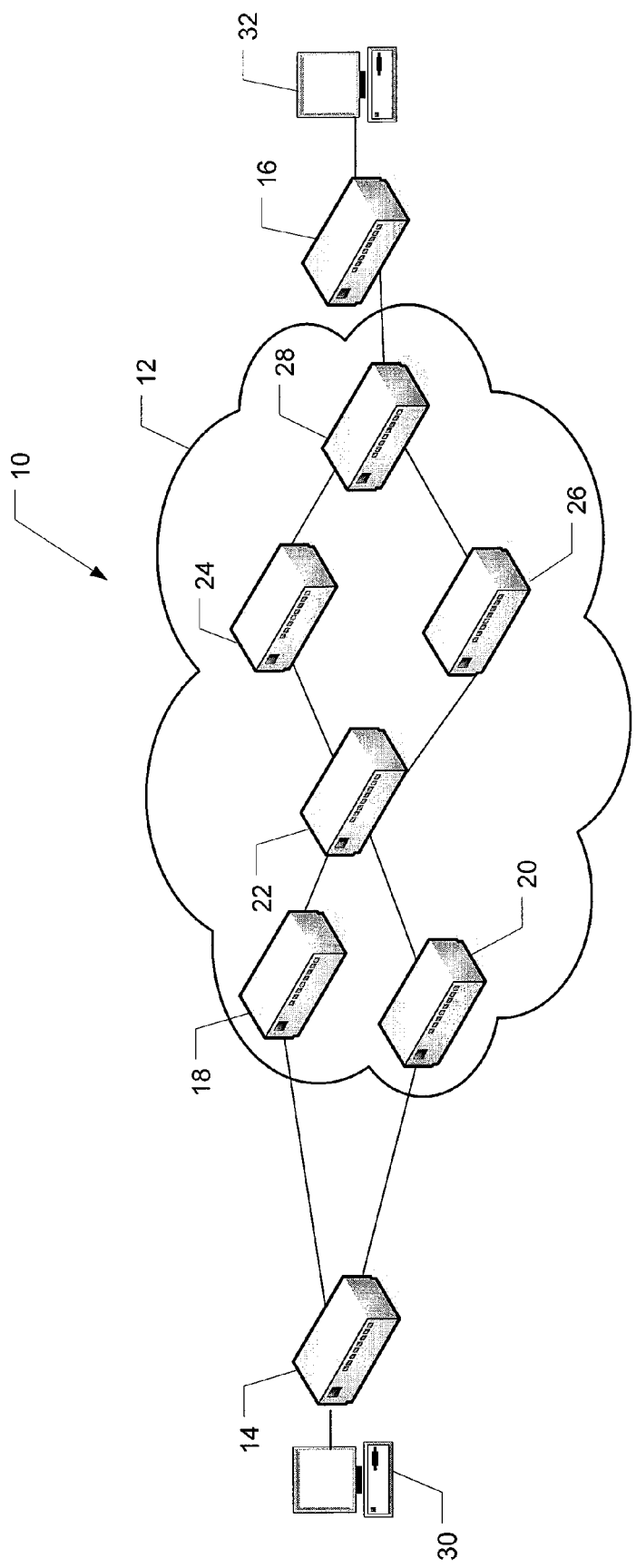
FIG. 1 shows an example of a Layer 2 network, in accordance with an example embodiment, with the network employing a system to manage topology changes in the network.

Referring to FIG. 1, reference numeral 10 generally indicates a network, in accordance with an example embodiment, to bridge data frames between two remote sections of a customer network through a provider backbone network 12. In the example embodiment depicted in FIG. 1, two customer network nodes, for example customer edge bridging devices 14 and 16, are connected by a number of devices that form part of the provider backbone network 12. The provider backbone network 12 may be a Layer 2 network or Data Link Layer network, e.g., a virtual bridged wide area network, alternatively called a Provider Backbone Bridged Network (PBBN), in accordance with current drafts of IEEE standard 802.1ah.

The customer edge bridging device 14 may be connected to provider edge bridging devices 18 and 20, which may, in an example embodiment, be backbone edge bridges (BEBs). The provider edge bridging devices 18 and 20 may, in turn, be connected to a provider core bridging device 22, which may be connected to two provider core bridging devices 24 and 26. Similarly, the provider core bridging devices 24 and 26 may, in turn, be connected to a provider edge bridging device 28, which may also be a backbone edge bridge (BEB). It will be appreciated that the provider backbone network 12 may include any number of bridging devices arranged in different configurations.

As mentioned, the provider edge bridging devices 18, 20, and 28, together with the provider core bridging devices 22, 24, and 26 form a provider backbone network for transporting data between customer nodes, e.g., the remote customer edge bridging devices 14 and 16. It will also be appreciated that any number of customer nodes may be present and that two customer nodes are shown merely by way of illustration.

The Provider Backbone Bridged Network (PBBN) interconnects provider edge bridging devices by various virtual local area networks (VLANs), e.g., Backbone VLANs (B-VLANs), which are independent logical networks within the physical network. Each independent logical network may be associated with a number of customers for which services are provided. For example, IEEE draft standard 802.1ah specifies the format of a Service Instance Tag (I-TAG) that encapsulates customer addresses and also introduces a Service Instance Identifier (I-SID) that allows each backbone edge bridge to support a number of virtual media service instances and permits the unambiguous identification of service instances or customer services in a single PBBN. A Service VLAN Identifier (S-VID) is also used to identify a particular VLAN associated with a particular customer, while the draft standard further specifies interfaces that a provider backbone network can provide to transport data frames for particular customer S-VLANs.

In an example embodiment, each customer edge bridging device 14 and 16 is respectively connected to remote sections of a customer network. These sections of the customer network are respectively shown by an end customer device or computer 30 connected to the customer edge bridging device 14, and an end customer device or computer 32 connected to the customer edge bridging device 16.

As mentioned, the customer edge bridging device 14 is connected to two provider edge bridging devices 16 and 18, creating a dual-homing configuration for the customer. With two connections to the provider network 12, a redundant path for data flow is provided to protect the customer network against the failure or removal of particular network components, e.g., either the provider edge bridging device 18 or the provider edge bridging device 20, or the links between the customer edge bridging device 14 and these two provider edge bridging devices. The customer network may, in an example embodiment, use their own Spanning Tree Protocol (STP) to configure and partition their active topology in order for the provider network connectivity not to result in a data loop. A Spanning Tree Protocol may, for example, find a spanning tree within a mesh network and may typically disable links that do not form part of that particular tree.

In a Layer 2 network, such as the network depicted in FIG. 1, the bridging devices do not automatically know where a certain network device is located. Rather, bridging devices in a Layer 2 network populate an address table in accordance with information received during data frame forwarding process, commonly referred to as transparent bridging. The address table, which may be called a bridging table, MAC (Media Access Control) address table, or Content Addressable Memory (CAM) table, may contain the MAC addresses of various devices as well as the port out of which a bridging device should forward frames for those frames to reach the correct destination. In an example embodiment, a bridging device may maintain a bridging table for every customer of the provider network. Bridging devices may therefore use the bridging tables for various customers during forwarding and/or filtering decisions, e.g., to determine where a frame is to be transmitted or tunnelled.

Bridging tables maintained by bridging devices may, in an example embodiment, time out after a predetermined period, e.g., every five minutes. This time out may be used to clear the bridging table to ensure that the MAC addresses maintained in the bridging tables are kept up to date.

For example, in the event that all the provider edge bridging devices 18, 20, and 28 have cleared their bridging tables, the following process may be followed to determine the location of a particular customer device. The customer edge bridging device 14 may receive data from the computer 30 to be transmitted over a service tunnel, e.g., an S-VLAN, to the computer 32 forming part of the customer network. The customer edge bridging device 14 may select the link to the provider edge bridging device 18 as its active uplink path through STP and may transmit a data frame to the provider edge bridging device 18. This provider edge bridging device 18 reads the MAC address of the source device, e.g., CM1 for the customer computer 30, and may save this address in a bridging table associated with the customer. The information obtained on the customer is obtained from the S-VID or Service VLAN Identifier, which may be included in the header of the data frame to be transmitted. The provider edge bridging device 18 may now know where to find the customer computer 30, should data be sent to this customer computer 30 in the future.

As the provider edge bridging device 18 does not know where the destination device (e.g., the computer 32 connected to the customer edge bridging device 16) is located, it may encapsulate the data frame using, for example, IEEE 802.1ah frame format, and transmit it to all provider edge bridging devices that participate in the service in question, e.g., provider edge bridging device 28, in the provider backbone network 12. The provider edge bridging device 28 may then learn of the customer end device, e.g., the computer 30 with MAC address CM1. The provider edge bridging device 28 may further learn that this device is reachable via the MAC-tunnel with destination address MAC M1, which is the MAC address for provider edge bridging device 18. The provider edge bridging device 28 may, after decapsulation of the data frame, transmit the data frame to customer edge bridging device 16 for further transmittal to the computer 32, having a MAC address of CM2. It will accordingly be appreciated that the provider edge bridging devices learn both customer and backbone MAC addresses and maintain a mapping of customer MAC addresses to backbone MAC addresses. Furthermore, provider edge bridging devices encapsulate customer service frames within backbone MAC addresses (B-MACs) for the purpose of forwarding these service frames over the PBBN.

In this type of network, the learning of customer MAC addresses is restricted to the edge devices, e.g., provider edge bridging devices 18, 20, and 28. As mentioned, the header of the encapsulated data frame includes a Service Instance Identifier (I-SID) that may be a 24 bit field carrying the I-SID to identify a particular customer service. The payload also includes an encapsulated customer destination address and an encapsulated customer source address, for a particular data frame.

After the process of learning the MAC addresses and relevant ports for the network, the provider edge bridging device 28 may store this information in its bridging table to know where to transmit any data frames destined for a computer (e.g., for computer 30) associated with this particular customer service instance. This may however present a problem in the event that the link between the customer edge bridging device 14 and the provider edge bridging device 18 fails and the customer device 30 had been quiescent for a particular period. In these circumstances, the entries of the bridging table of the provider edge bridging device 28 would remain the same, even though a new active path would have to be selected by the customer network STP, e.g., the new active path may be the link between customer edge bridging device 14 and provider edge bridging device 20. Any data frames transmitted from the provider edge bridging device 28 may in these circumstances be encapsulated with the wrong destination MAC address (obtained from the bridging table) and may be sent to provider edge bridging device 18 where it may be black-holed, until such time as the bridging tables clear on a time-out.

In terms of network protocols, the customer edge device that detects the change in topology may transmit change notifications to inform network devices in the provider backbone network to clear the respective bridging tables associated with a particular customer service. It is this change notification that is used in the present disclosure to manage topology changes in the network. For example, in an 802.1ad network the customer edge bridging device (e.g., the customer edge bridging device 14 shown in FIG. 1) may run a control plane protocol (e.g., a spanning tree protocol (STP)) that advertises or transmits a Topology Change Notifications (TCN) upon failover from an active to a standby path (e.g., failover from the provider edge bridging device 18 to the provider edge bridging device 20).

Figure 2:
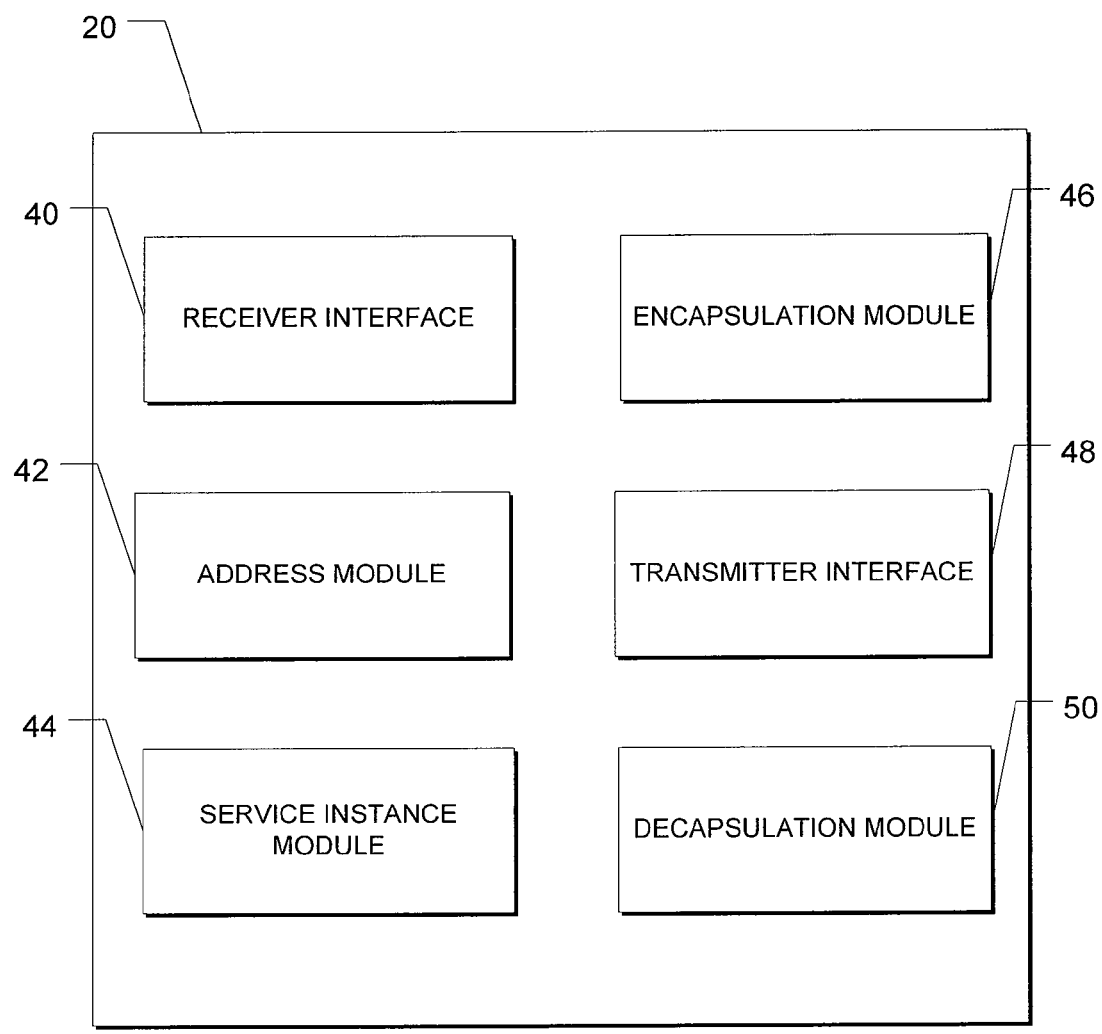
FIG. 2 shows a schematic diagram of a provider edge bridging device, in accordance with an example embodiment, that may be used in the network and system shown in FIG. 1.

In an example embodiment, with reference now to FIG. 2, the provider edge bridging device 20 is a backbone edge bridge (BEB) and comprises various modules to process the change notification (e.g., TCN) mentioned above. It will be appreciated that, although the provider edge bridging device 20 is described by way of example in detail below, the provider edge bridging devices 18 and 28 may have the same structure and functionality as that of the provider edge bridging device 20. Accordingly, the description of the provider edge bridging device 20 may apply equally to these two devices or any one or more further provider edge bridging devices that may form part of the provider backbone network 12.

The provider edge bridging device 20 may comprise a receiver interface 40 to receive a change notification from a customer edge bridging device 14. For example, if the customer topology changes due to the failure of a particular network component or link, such as the link between customer edge bridging device 14 and provider edge bridging device 18 that previously was the active link, a change notification, e.g., a TCN, may be generated at the bridging device that detects a change in topology. As the client topology has changed, this change notification may, in an example embodiment, be generated by the customer edge bridging device 14. In an example embodiment, and in accordance with standard practice, this change notification is forwarded to the active provider edge bridging device 20.

A change notification may, in an example embodiment, be a Bridge Protocol Datagram Unit (BPDU), which is defined by the IEEE 802.1D Spanning Tree Protocol (STP). A BPDU is typically a control frame that may include particular information on the customer device(s) and the service instance in order to associate the change notification with a particular customer service, thereby allowing a bridging device to identify relevant bridging tables to be cleared.

In an example embodiment, the provider edge bridging device 20 further comprises an address module 42 responsible for maintaining various address or bridging tables for each customer for which services are provided on the provider network 12. As mentioned above, different terminology may be used for the address or bridging table, for example a MAC table or a CAM table. In a Layer 2 network, the address tables for the different customer services include MAC addresses.

The address module 42 may further be responsible for clearing the bridging table of a particular customer service after a predetermined period, in the event that the provider edge bridging device 20 has not received any data frames to transmit from a particular bridging device, e.g., a host bridging device that is quiescent. In an example embodiment, the default aging time may be 300 seconds.

The address module 42 may further be configured, in response to the provider edge bridging device 20 receiving the change notification, to clear the address or bridging table associated with the customer service. The bridging table associated with a particular customer may be cleared to avoid black-holing and for the transparent bridging process, in order to learn where edge bridges reside, to resume. As mentioned above, black-holing may occur in situations where the customer topology has changed, but because the bridging devices forming part of a provider network have not been informed, the bridging devices may tunnel or transmit data frames to bridging devices that may no longer be part of the active bridging path.

The provider edge bridging device 20 may further comprise a service instance module 44 to associate the change notification received from the customer edge bridging device 14 with a customer service. Customers may be identified through, for example, the port on which the change notification arrived, or a Service VLAN Identifier (S-VID) that may form part of the header or payload of the change notification. This S-VID associates the customer service with a particular S-VLAN. The service instance module 44 may, for example, parse the header or payload of a change notification to access the Service VLAN Identifier of the customer. By obtaining the S-VID, the customer service instance can be identified. This may further allow the service instance module 44 to also identify at least one or a set of destination provider edge bridging devices associated with the customer service.

The service instance module 44 may further be configured to map the Service VLAN Identifier with a service identifier, e.g., a service instance identifier (I-SID). In an example embodiment, the service instance module 44 may identify the at least one destination provider edge bridging devices by obtaining a unicast or multicast address for the service instance identifier (I-SID) associated with the particular customer service.

In an example embodiment, the provider edge bridging device 20 may also comprise an encapsulation module 46 to encapsulate the received change notification in a tunnelled data frame. During the encapsulation process, the destination MAC address of the destination provider edge bridging device(s), as well as the source MAC address of the provider edge bridging device 20, may be added to the header of the tunnelled data frame. The encapsulation module 46 may add the service identifier (I-SID) identified by the service instance module 44 to the header of the tunnelled data frame encapsulating the change notification, for further provider edge bridging devices to associate the encapsulated change notification to a particular customer service.

Once the change notification is encapsulated in a tunnelled data frame, other bridging devices, e.g., core bridging devices 22, 24, and 26 that may receive the tunnelled data frame for further transmission to other bridging devices would not consider the change notification, as core bridging devices need not decapsulate any tunnelled data frames, but would forward the data frame to the relevant provider edge bridging device the tunnelled data frame is destined for.

In an example embodiment, the provider edge bridging device 20 may further comprise a transmitter interface 48 to forward the tunnelled data frame encapsulating the change notification to the at least one destination provider edge bridging device associated with the customer service. In the case of 802.1ah PBBN, the data frame may be tunnelled over the particular MAC tunnel associated with the customer service. Once the data frame encapsulating the change notification is received by the destination provider edge bridging device, this device may process the data frame in order to access the change notification. In the example network 10 of FIG. 1, the destination provider edge bridging device may be provider edge bridging device 28. However, as the provider edge bridging devices 18, 20, and 16 may be substantially the same, and to simplify the description of the provider edge bridging devices, the processing of a received data frame encapsulating a change notification is described below in accordance with the provider edge bridging device 20, shown in FIG. 2.

To process a received tunnelled data frame encapsulating a change notification, in one example embodiment, the receiver interface 40 is further configured to receive a data frame tunnelled from another provider edge bridging device.

The provider edge bridging device 20 may further comprise a decapsulation module 50 to decapsulate the received data frame thereby to access the encapsulated change notification associated with a particular customer service.

It will be appreciated that, in one example embodiment, the encapsulation module 46 and the decapsulation module 50 may be a single module configured to encapsulate and/or decapsulate frames.

In an example embodiment, once the data frame has been decapsulated, the service instance module 44 may identify the at least one or a set of customer edge facing ports, e.g., port connecting to at least one customer edge bridging device 16, associated with the customer service. This identification may be performed by, for example, parsing the header of a tunnel encapsulated change notification to access the service identifier (I-SID) of the customer. By obtaining the service identifier, the customer can be identified and the at least one or set of customer edge facing ports associated with the service instance of the customer service may be obtained.

The address module 42 of the provider edge bridging device may, as described above, in response to processing the change notification, clear the address or bridging table associated with the particular customer service. As mentioned, the bridging table associated with a particular customer is cleared to avoid black-holing.

In an example embodiment, the transmitter interface 48 may then transmit the change notification to the identified customer edge facing port(s) for the customer edge bridging device or devices to also clear their associated bridging tables.

It will be appreciated that, in one example embodiment, service instance module 44, and the encapsulation module 46 may form part of IEEE 802.1ah Backbone Edge Bridge (BEB) I-component functionality of the provider edge bridging device 20. Similarly, it would be appreciated that the receiver interface 40 and transmitter interface 48 may form part of either the I-component or B-component functionality of the provider edge bridging device 20.

Figure 3:
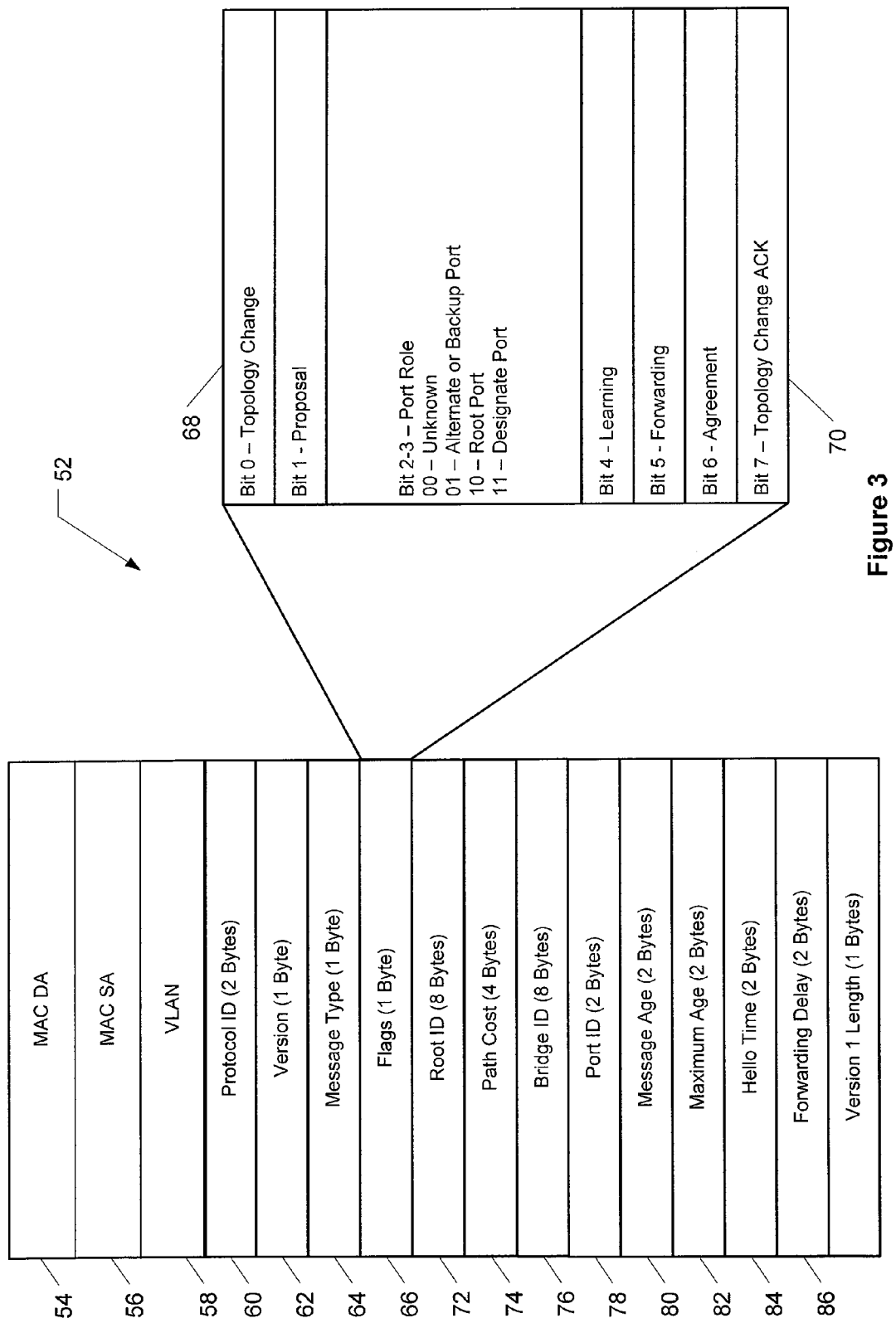
FIG. 3 shows an example of a frame for a change notification, in accordance with an example embodiment, transmitted in the network of FIG. 1.

Turning now to FIG. 3, an example embodiment of a frame 52 for a change notification is shown. The change notification comprises different fields for use by a bridging device during the forwarding of the frame. For example, the frame may comprise the MAC destination address (MAC DA) 54, the MAC source address (MAC SA) 56 and the Service VLAN 58 associated with the frame. A Protocol Identifier (ID) field 60 may be included that indicates the type of protocol, and this field may contain the value zero. A version field 62 may indicate the version of the protocol used, while a message type field 64 indicates the type of message being transmitted.

A flags field 66 may include a topology change (TC) bit 68, which signals a topology change to other bridges, while a topology change acknowledgment (TCA) bit 70 is set to acknowledge receipt of a configuration message with the TC bit set.

The frame may further include a root ID field 72 which indicates a root bridge by listing its 2-byte priority followed by its 6-byte ID, while a root path cost field 74 may indicate the cost of the path from the bridge sending the configuration message to the root bridge. A bridge ID field 76 may further indicate the priority and ID of the bridge sending the message, while a port ID field 78 indicates the port number (IEEE or Cisco STP BPDU) or the ring and bridge number (IBM STP BPDU) from which the configuration message was sent. This field allows loops created by multiple attached bridges to be detected and corrected.

A message age field 80 may be included in the frame which indicates the amount of time that has elapsed since the root sent the configuration message on which the current configuration message is based, while a maximum age field 82 may indicate when the current configuration message should be deleted. A hello time field 84 indicates the time between root bridge configuration messages, while a forward delay field 86 indicates the length of time that bridges should wait before transitioning to a new state after a topology change. If a bridge transitions too soon, it is possible that not all network links will be ready to change their state and loops can result.

Figure 4:
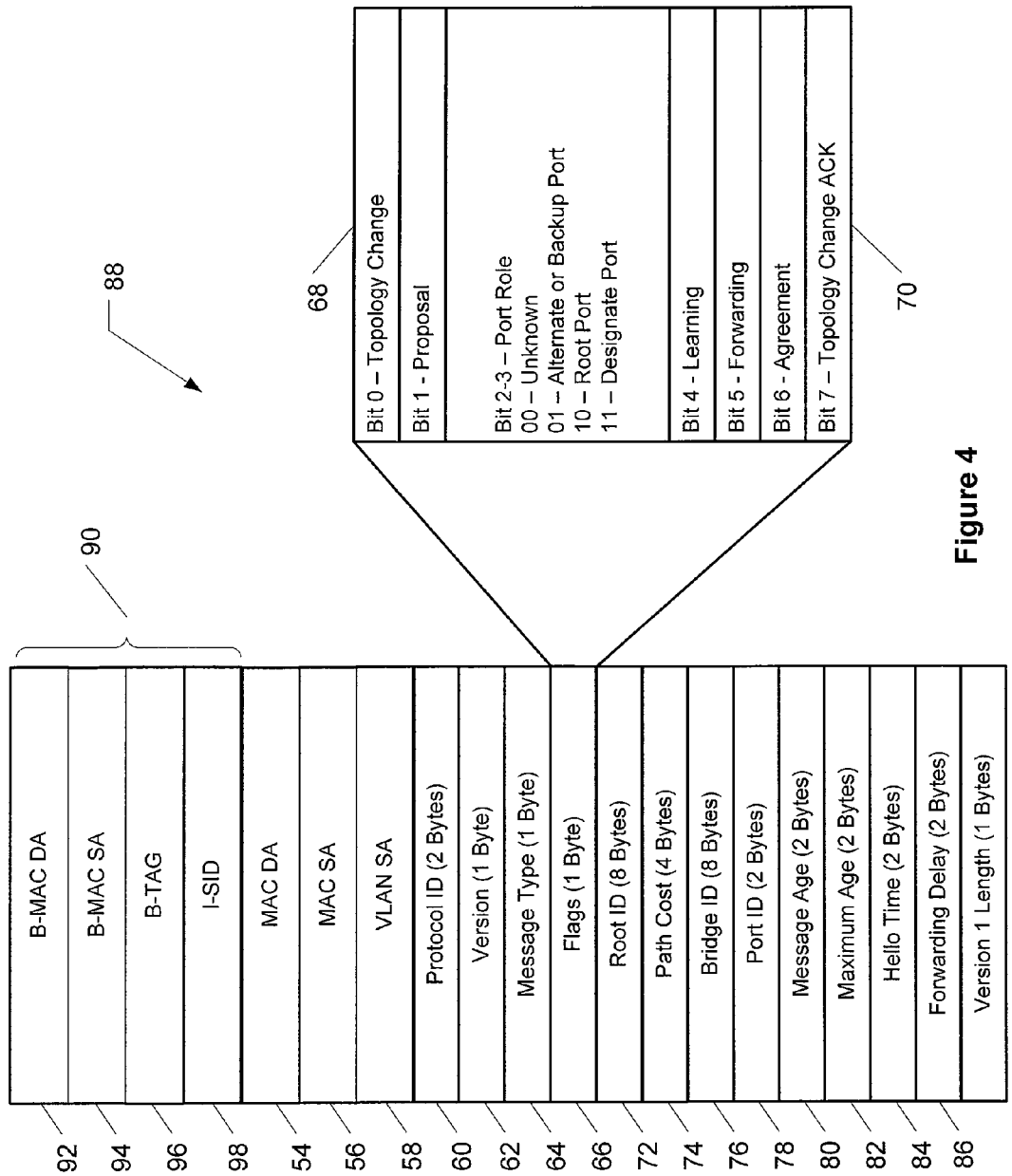
FIG. 4 shows an example of a data frame, in accordance with an example embodiment, which encapsulates the change notification shown in FIG. 3.

FIG. 4 shows an example embodiment of a data frame 88 that encapsulates the change notification shown in FIG. 4. The data frame comprises the same fields as those shown for the frame 52 for a change notification, although certain fields have been added to a header 90. The added fields may include a destination BMAC address field (B-MAC DA) 92 to indicate the address of the destination provider edge bridging device where the data frame is to be sent, as well as a source BMAC address field (S-MAC DA) 94 to indicate the address of the source provider edge bridging device from which the frame is originally sent. The header may further include a B-TAG field 96 which indicates the Backbone VLAN tag, as well as an I-SID field 98 which indicates the service instance identifier.

Figure 5:
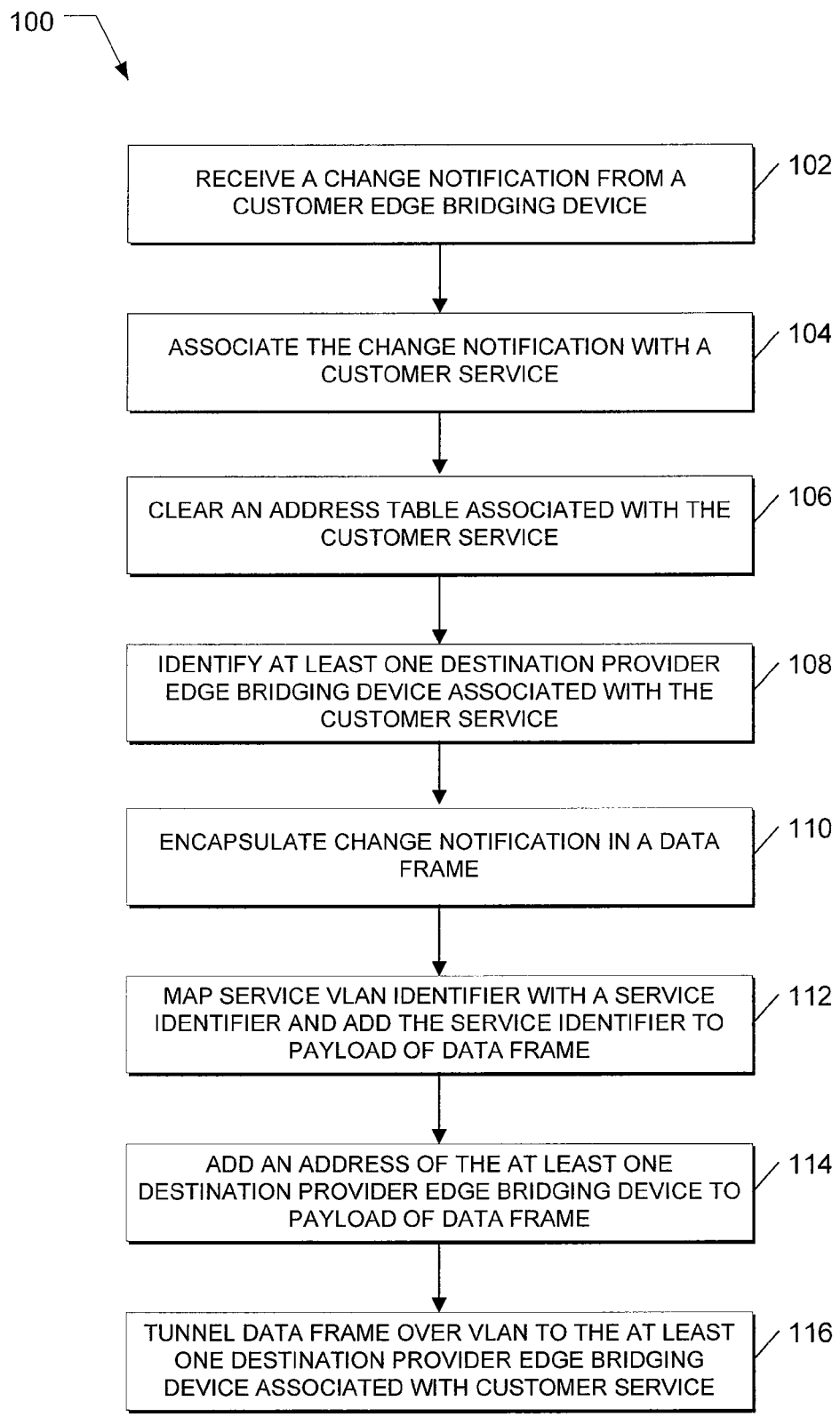
FIG. 5 shows a flow diagram of an example method, in accordance with an example embodiment, for managing a topology change in the network of FIG. 1.

FIG. 5 shows a flow diagram of a method 100, in accordance with an example embodiment, for managing topology changes in a Layer 2 network. In one example embodiment, the method 100 may be implemented by any one of the provider edge bridging devices 18, 20, or 28 of FIG. 1. The method 100 is described by way of example with reference to FIG. 7 (which includes the same hardware topology of FIG. 1). The method 100 may, for example be implemented by any one of the example provider edge bridging devices 18, 20, and 28 and is described by way of example with reference to the provider edge bridging device 20.

Figure 7:
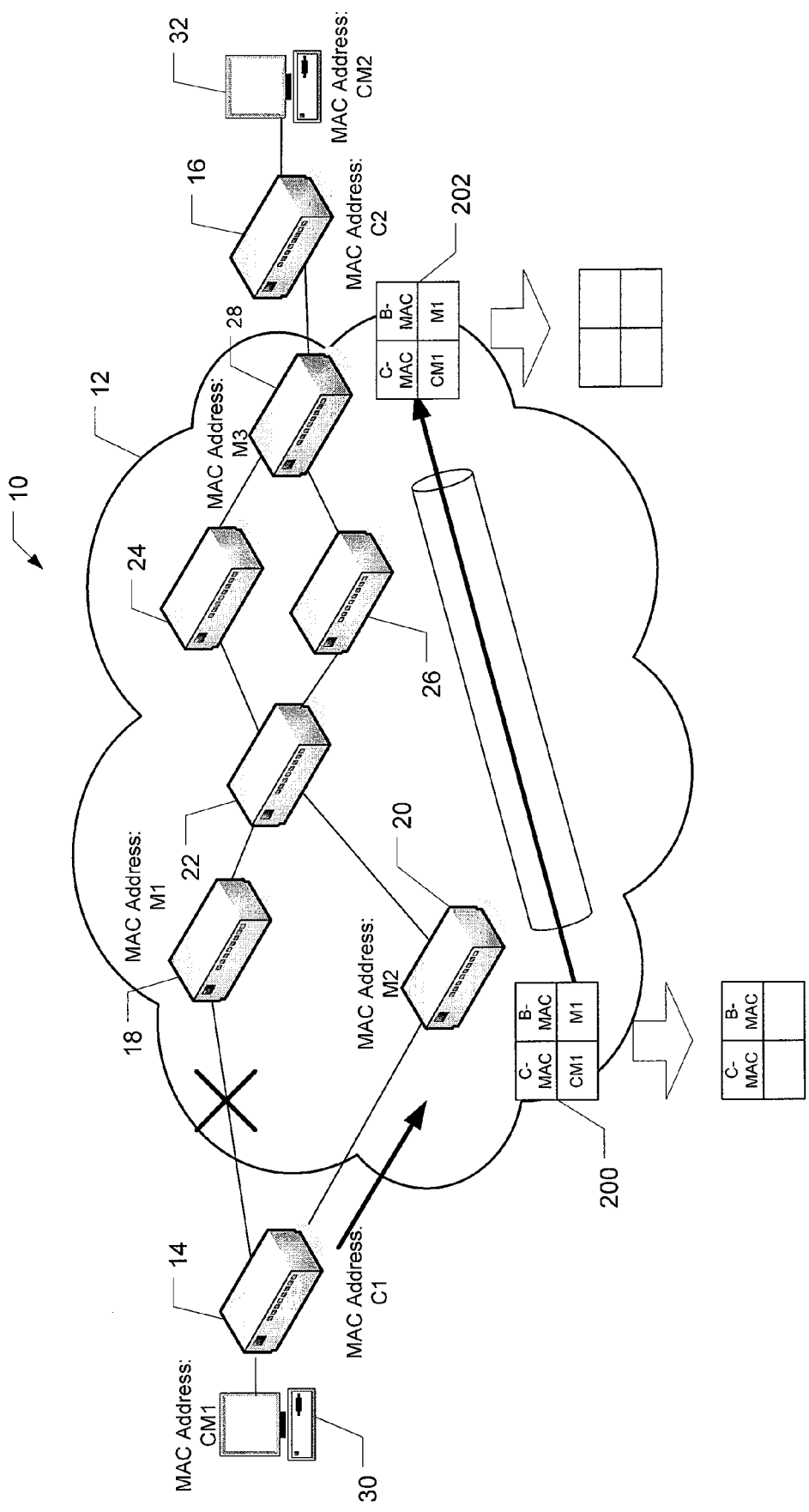
FIG. 7 shows an example of the Layer 2 network of FIG. 1, in which the example methods of FIG. 5 and FIG. 6 have been deployed, in accordance with an example embodiment.

FIG. 7 indicates examples of different MAC addresses that may be associated with the customer end devices 30 and 32, the customer edge bridging devices 14 and 16, as well as the provider edge bridging devices 18, 20, and 28, which have already been described with reference to FIG. 1.

Referring to FIG. 5, as shown by block 102, a receiver interface 40 of the provider edge bridging devices 20 may receive a change notification that may have been generated by a customer edge bridging device 14 (see also FIG. 7). As described in more detail above, this change notification may have been generated by the customer edge bridging device 14 in response to a customer topology change, e.g., the failure of the link between the customer edge bridging device 14 and the provider edge bridging device 18.

The service instance module 44 of the provider edge bridging device 20 may, as indicated by block 104, associate the change notification with a particular customer service. For example, by relying on the identity of the port on which the change notification was received, or the change notification may comprise a Service VLAN Identifier (S-VID) that the service instance module 44 may use to associate the change notification with the customer service.

In response to receiving the change notification and after the change notification has been associated with the particular customer service, the address module 42 of the provider edge bridging device 20 may clear an address table (e.g., a bridging table shown by reference numeral 200 in FIG. 7) of the MAC addresses (e.g., a C-MAC address for the customer end device 30 and a B-MAC address for the MAC tunnel) previously maintained in the address table associated with the customer service. This is shown by block 106. The address table may also referred to as a MAC table or CAM table.

As mentioned, the provider edge bridging device 20 may maintain separate bridging tables for each of the customers to which VLAN services are provided. When a network link or component fails, it may thus only be necessary to clear address tables relating to a particular customer, which customer would be identifiable by some service identifier (e.g., port or VLAN).

The service instance module 44 of the provider edge bridging device 20 may also, as indicated by block 108, identify at least one destination provider edge bridging device associated with the customer service. For example, the provider edge bridging device 20 may identify the destination provider edge bridging device 28 by obtaining a unicast or multicast address for a service instance mapped to a service VLAN, which is associated with the customer service.

As shown by block 110, the encapsulation module 46 of the provider edge bridging device 20 may now encapsulate the change notification in a tunnelled data frame. This encapsulation may ensure that each of the provider core bridging devices 22, 24, and 26 does not process the change notification and accordingly, does not clear their respective bridging tables. The core bridging devices are enabled to forward this encapsulated data frame as these devices only rely on information relating to the destination provider edge bridging device to forward the frames.

The service instance module 44 may also map the Service VLAN Identifier (S-VID) with a service identifier (I-SID) to allow destination provider edge bridging devices to associate the encapsulated change notification with the particular customer. In an example embodiment, the encapsulation module 46 may further add the service identifier to the header of the tunnelled data frame in which the change notification has been encapsulated. These operations are shown by block 112.

In an example embodiment, and as shown by block 114, the encapsulation module 46 may also add an address of the at least one destination provider edge bridging device, e.g., MAC address M3 of the destination provider edge bridging device 28, to the header of the data frame in which the change notification has been encapsulated. This address may be used by the core bridging devices, e.g., provider core bridging devices 22 and 24 or 26, to tunnel the data frame to the destination provider edge bridging device 28.

As indicated by block 116, the data frame encapsulating the change notification may now be tunnelled over, for example, a MAC tunnel associated with the customer service to the at least one destination provider edge bridging device 28. As mentioned, the provider core bridging devices 22, 24, and 26 need not decapsulate the change notification and will forward the data frame to the destination provider edge bridging device 28 without further processing.

Figure 6:
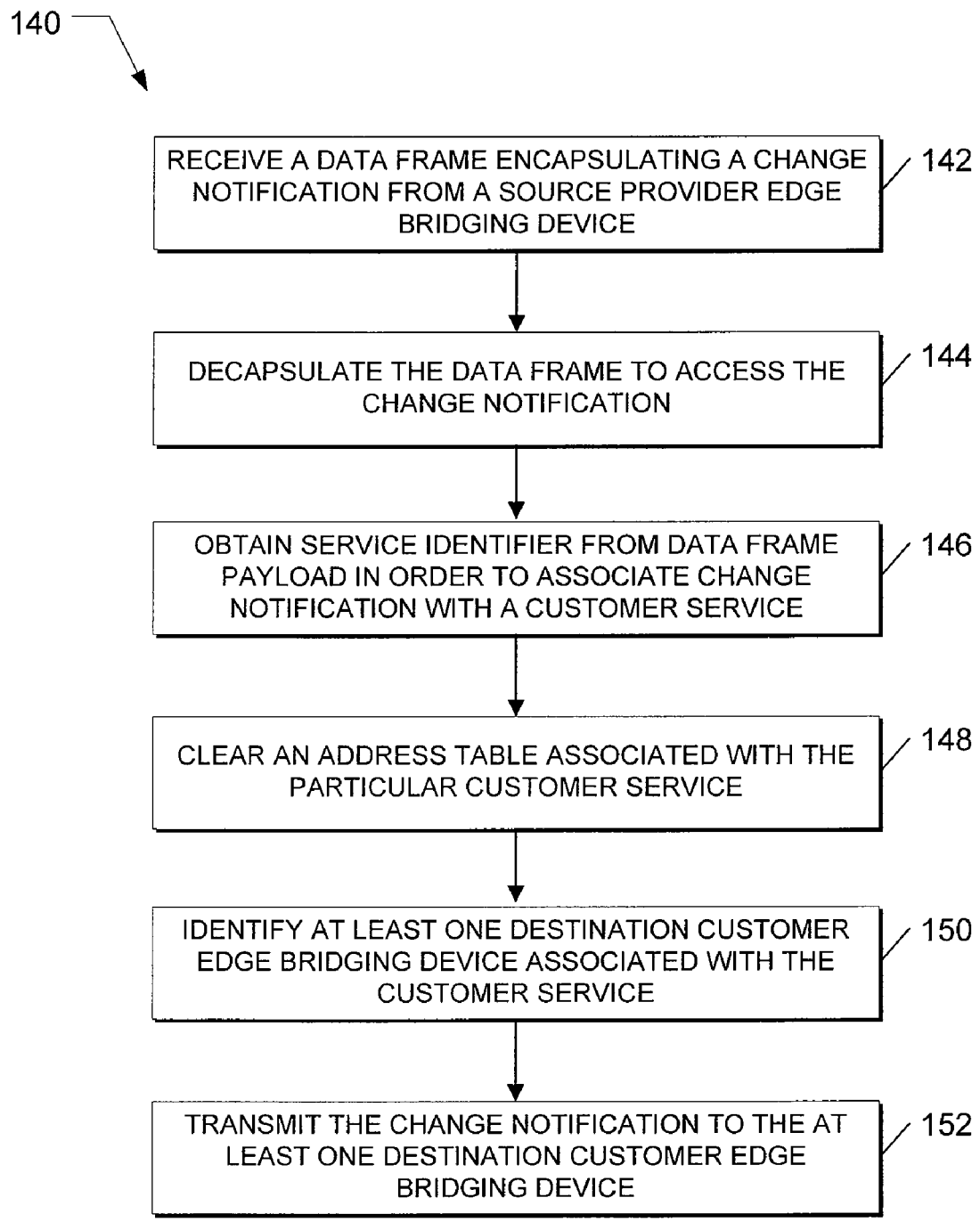
FIG. 6 shows a flow diagram of a further example method, in accordance with an example embodiment, for managing a topology change in the network of FIG. 1.

FIG. 6 shows a further flow diagram of a method 140, in accordance with an example embodiment, for managing topology changes in a Layer 2 network from a destination provider edge bridging device. In one example embodiment, the method 140 may be implemented by any one of the provider edge bridging devices 18, 20, or 28 of FIG. 1. The method is described by way of example with reference to FIG. 7 and, in particular, with reference to the provider edge bridging device 28 (which may include the same or similar modules to the provider edge device 20).

As shown by block 142, a receiver interface 40 of the destination provider edge bridging device 28 receives a tunnelled data frame encapsulating a change notification, e.g., the data frame described in accordance with the flow diagram of FIG. 5, which was tunnelled from the provider edge bridging device 20.

Once this data frame is received, a decapsulation module 50 of the destination provider edge bridging device 28 may, in an example embodiment, decapsulate the data frame to access the change notification. During this decapsulation process, the service instance module 44 may also obtain a service identifier (I-SID) that may have been included in the header of the data frame. The service identifier may be used by the service instance module 44 to associate the change notification with a particular customer service. These steps are shown by block 144 and 146.

In an example embodiment, an address module 42 of the destination provider edge bridging device 28 may clear an address table of the destination provider edge bridging device 28 that is associated with the particular customer service (shown by block 148). This address table or bridging table is indicated by reference numeral 202 in FIG. 7.

A service instance module 44 of the destination provider edge bridging device 28 may identify, as shown by block 150, at least one port (or a set of ports) connecting to a customer edge bridging device, e.g., the port connecting to customer edge bridging device 16 associated with the customer service. The at least one port or set of ports may be identified through the use of the service identifier that may have been added to the header of the data frame received, as explained in more detail above.

In an example embodiment, a transmitter interface 48 may now transmit the change notification over the port(s) connecting to customer edge bridging device associated with the customer (shown by block 152), for this customer edge bridging device to also clear its associated address tables.

It will be appreciated that the present disclosure provides a mechanism that manages topology changes in a Layer 2 network without the unnecessary flooding over a provider backbone network. The mechanism provides that only provider edge bridges clear their respective address tables, while the provider core bridges need not clear any tables, in particular as provider core bridges do not maintain customer MAC addresses in their address tables.

Conventional solutions, for example for 802.1ad networks, involve having the customer edge bridge run the STP that advertises the TCN upon failover from the active to the standby path. The provider edge bridge may snoop on this TCN and generate a Customer Change Notification (CCN) that causes all provider bridges in the network (e.g., both provider edge bridges and provider core bridges) to flush the MAC entries associated with a particular customer service. However, the example embodiments described herein may avoid flushing all provider bridges (e.g., the core provider bridging devices 22, 24, and 26) and may thus at least reduce unnecessary flooding of the core network.

Also, in the event that one of the provider edge bridging devices is a Layer 3 gateway, e.g., a router located at the edge of an IP service edge and terminating 802.1ah-encapsulated customer traffic into a Layer 3 service, the present mechanism may also address traffic black-holing.

Figure 8:
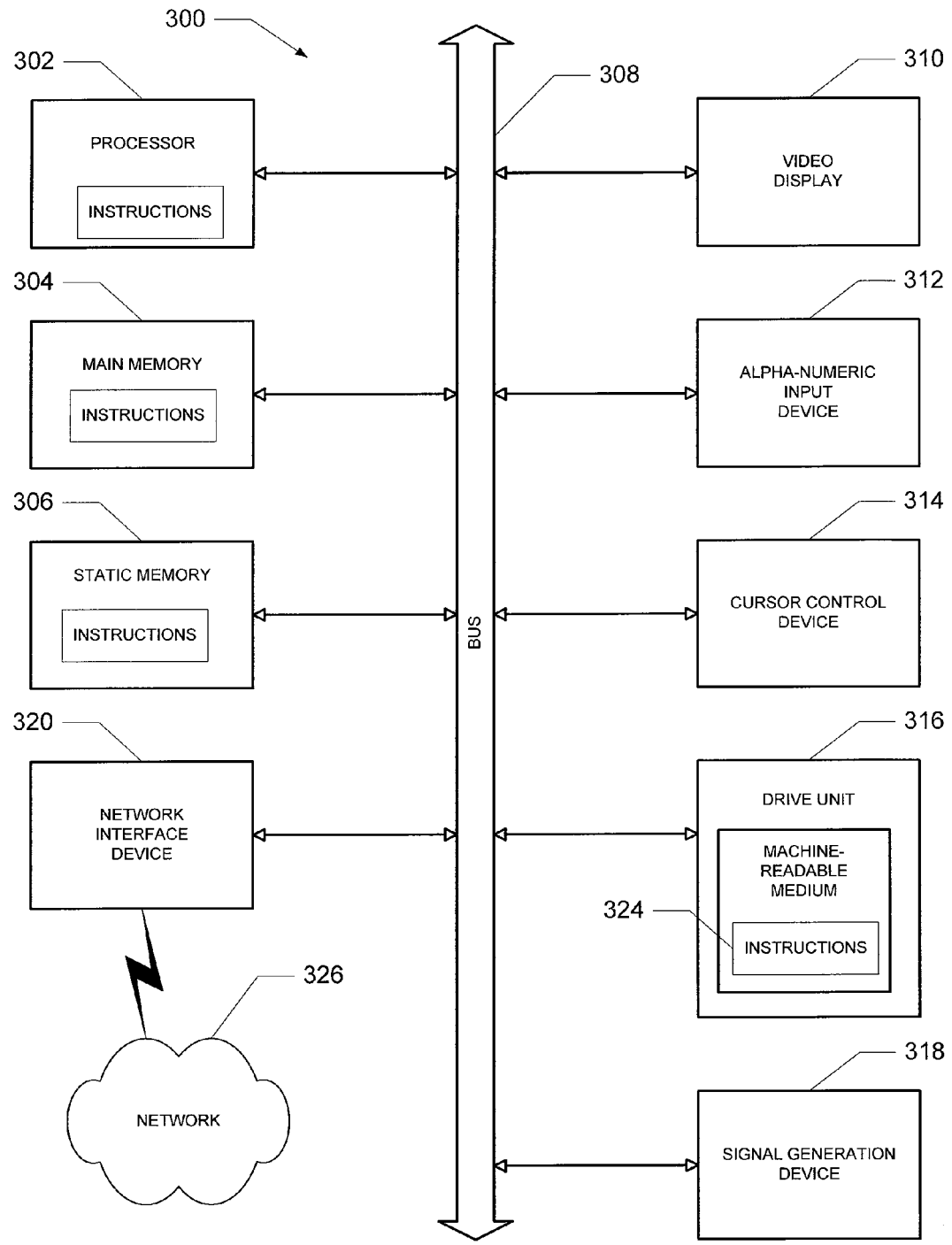
FIG. 8 shows a diagrammatic representation of a machine in the example form of a computer system within which a set of instructions for causing the machine to perform any one or more of the methodologies discussed herein may be executed.

FIG. 8 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or used by any one or more of the methodologies or functions described herein. The software 324 may also reside, completely or at least partially, within the main memory 304 and/or within the processor 302 during execution thereof by the computer system 300, the main memory 304, and the processor 302 also constituting machine-readable media.

The software 324 may further be transmitted or received over a network 326 via the network interface device 320 using any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present application, or that is capable of storing, encoding, or carrying data structures used by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a change notification at a provider edge bridging device from a customer edge bridging device in response to a change in network topology, the change notification being a bridge protocol datagram unit;
   associating the change notification with a customer service;
   identifying at least one destination provider edge bridging device associated with the customer service;
   clearing an address table associated with the customer service at the provider edge bridging device;
   encapsulating, after the address table is cleared, the change notification in a data frame such that the change notification is inaccessible by a bridging device that receives the data frame; and
   tunnelling the data frame from the provider edge bridging device over a tunnel comprising at least one core bridging device to the at least one destination provider edge bridging device associated with the customer service, the at least one core bridging device tunnelling the data frame based on information relating to the destination provider edge bridging device, the tunnelling including ensuring that the at least one core bridging device refrains from clearing an address table therein as a function of the data frame.

2. The method of claim 1, wherein encapsulating the change notification in a data frame includes adding an address of the at least one destination provider edge bridging device to a payload of the data frame.

3. The method of claim 1, wherein the change notification comprises a service VLAN identifier to associate the change notification with the customer service, the address table comprises a MAC address table and the tunnel comprises a MAC tunnel.

4. The method of claim 3, wherein encapsulating the change notification comprises mapping the service VLAN identifier with a service instance identifier and adding the service instance identifier to the data frame.

5. The method of claim 4, wherein the at least one destination provider edge bridging device is identified by obtaining a unicast or multicast address for the service instance identifier of the customer service.

6. The method of claim 2, wherein the at least one destination provider edge bridging device is identified by associating a port on which the change notification arrives with the customer service.

7. The method of claim 4, further comprising:

receiving, at the destination provider edge bridging device, the data frame tunnelled from the provider edge bridging device;

decapsulating the data frame to access the change notification and to access the service instance identifier thereby to associate the change notification with the customer service; and clearing an address table of the destination provider edge bridging device associated with the customer service.

8. A method comprising:

receiving, at a destination provider edge bridging device, a data frame encapsulating a change notification such that the change notification is inaccessible by a bridging device that receives the data frame, the change notification generated from a customer edge bridging device in response to a change in network topology and being a bridge protocol datagram unit, the data frame tunnelled from a provider edge bridging device over a tunnel comprising at least one core bridging device to the at least one destination provider edge bridging device such that the at least one core bridging device refrains from clearing an address table therein as a function of the data frame, the provider edge bridging device clearing an address table for a customer service associated with the change notification prior to encapsulating the change notification in the data frame;

decapsulating, at the at least one destination provider edge bridging device, the data frame to access the change notification and to access a service instance identifier thereby to associate the change notification with the customer service; and clearing an address table of the at least one destination provider edge bridging device associated with the customer service.

9. The method of claim 8, further comprising identifying at least one port connected to at least one destination customer edge bridging device associated with the customer service and transmitting the change notification over the at least one port to the at least one destination customer edge bridging device associated with the customer.

10. A provider edge bridging device comprising:

memory to store one or more address tables; and a processor operatively coupled to the memory, the processor configured to run:

a receiver interface to receive a change notification from a customer edge bridging device in response to a change in network topology, the change notification being a bridge protocol datagram unit;

a service instance module to associate the change notification with a customer service and to identify at least one destination provider edge bridging device associated with the customer service;

an address module to clear an address table associated with the customer service;

an encapsulation module to encapsulate, after the address table is cleared, the change notification in a data frame such that the change notification is inaccessible by a bridging device that receives the data frame; and a transmitter interface to tunnel the data frame through a tunnel comprising at least one core bridging device to the at least one destination provider edge bridging device associated with the customer service, the transmitter interface configured to ensure that the at least one core bridging device refrains from clearing an address table therein as a function of the data frame.

11. The provider edge bridging device of claim 10, wherein the encapsulation module is configured to add an address of the at least one destination provider edge bridging device to a header of the data frame.

12. The provider edge bridging device of claim 10, wherein the receiver interface is configured to obtain a service VLAN identifier from the change notification to associate the change notification with the customer service.

13. The provider edge bridging device of claim 12, wherein the service instance module is configured to map the service VLAN identifier with a service instance identifier and the encapsulation module is configured to add the service instance identifier to the header of the data frame.

14. The provider edge bridging device of claim 13, wherein the service instance module is configured to identify the at least one destination provider edge bridging device by obtaining a unicast or multicast address for the service instance identifier of the customer service.

15. The provider edge bridging device of claim 10, wherein the service instance module identifies the at least one destination provider edge bridging device by associating a port on which the change notification arrives with the customer service.

16. The provider edge bridging device of claim 10, wherein the address table comprises a MAC address table and the tunnel comprises a MAC tunnel.

17. The provider edge bridging device of claim 10, wherein the receiver interface is configured to receive a data frame encapsulating a change notification tunnelled from a source provider edge bridging device through a tunnel comprising at least one core bridging device.

18. The provider edge bridging device of claim 17, further comprising a decapsulation module configured to decapsulate the data frame to access the change notification and to access a service instance identifier thereby to associate the change notification with a customer service.

19. The provider edge bridging device of claim 18, wherein the service instance module is configured to identify at least one port connecting to at least one customer edge bridging device associated with the customer service and the transmitter interface is configured to transmit the change notification over the at least one port to the at least one destination customer edge bridging device associated with the customer service.

20. The provider edge bridging device of claim 10, wherein the encapsulation module and the service instance module form part of an IEEE 802.1ah BEB I-component of the provider edge bridging device.

21. The provider edge bridging device of claim 10, wherein the receiver interface and transmitter interface form part of an IEEE 802.1ah BEB I-component or B-component of the provider edge bridging device.

22. A provider edge bridging device comprising:

means for receiving a change notification from a customer edge bridging device in response to a change in network topology, the change notification being a bridge protocol datagram unit;

means for associating the change notification with a customer service and for identifying at least one destination provider edge bridging device associated with the customer service;

means for clearing an address table associated with the customer service;

means for encapsulating, after the address table is cleared, the change notification in a data frame such that the change notification is inaccessible by a bridging device that receives the data frame; and means for tunnelling the data frame from the provider edge bridging device over tunnel comprising at least one core bridging device to the at least one destination provider edge bridging device associated with the customer service, the at least one core bridging device tunnelling the data frame based on information relating to the destination provider edge bridging device, the means for tunnelling configured to ensure that the at least one core bridging device refrains from clearing an address table therein as a function of the data frame.

* * * * *